UNITED STATES PATENT OFFICE.

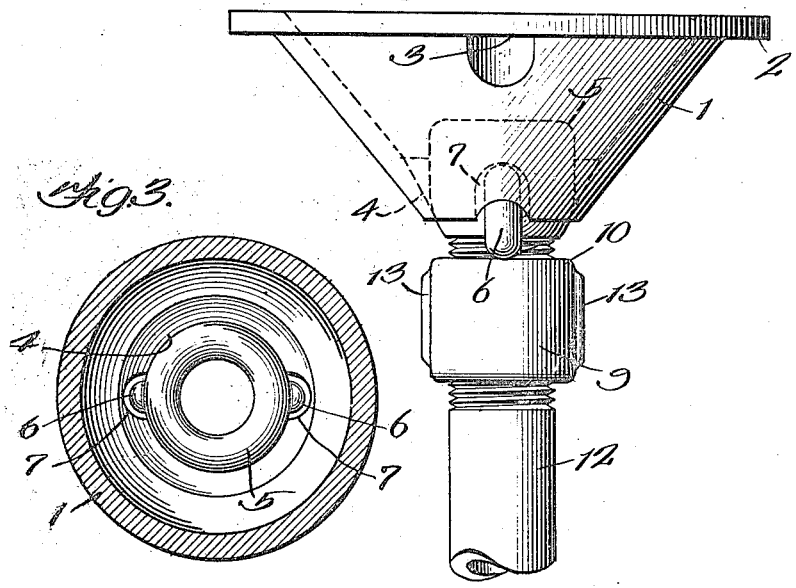

HERBERT L. HULL AND THOMAS N. LOFGREN, OF CHICAGO, ILLINOIS, ASSIGNORS TO CENTRAL ELECTRIC COMPANY, OF CHICAGO, ILLINOIS, A CORPORATION OF ILLINOIS.

SUSPENSION DEVICE.

1,293,448.

Specification of Letters Patent. Patented Feb. 4, 1919.

Application filed March 26, 1917. Serial No. 157,357.

*To all whom it may concern:*

Be it known that we, HERBERT L. HULL and THOMAS N. LOFGREN, citizens of the United States, residing at Chicago, in the county of Cook and State of Illinois, have invented a certain new and useful Improvement in Suspension Devices, of which the following is a specification.

Our invention relates to suspension devices, more particularly for suspending electric fixtures from ceilings. The invention is especially advantageous in factories, warehouses and other places where a comparatively inexpensive equipment is wanted and where goods, merchandise, machinery or other objects are apt to be moved about from place to place in the building. The device is exceptionally useful in buildings made of reinforced concrete. It is our purpose to provide a construction having a connection which will be freely swingable and at the same time be non-rotatable, so that it will be held while the stem of the fixture is being screwed onto it.

The objects are obtained by the mechanism illustrated in the accompanying drawings, in which:

Figure 1 is a side view of the assembled device.

Fig. 2 is an axial section thereof.

Fig. 3 is a plan section on the line 3—3, Fig. 2.

Fig. 4 is a bottom perspective of the lower portion of the canopy, and

Fig. 5 is a perspective view showing the manner of assembling two of the principal elements of the device.

Similar numerals refer to similar parts throughout the several views.

In the form selected to illustrate the invention, the canopy 1 has a flange 2 with screw holes 3 designed to fit a standard outlet box. This canopy may be varied in outline but may well be in the shape of a hollow inverted cone, truncated to form a seat or socket for supporting the member 5 which for convenience may be termed the "ball." The ball is rounded at the lower end so as to be freely movable when seated and has two ears 6, 6 at the side which fit into notches 7, 7 formed in the lower end of the canopy. The ears themselves are preferably somewhat rounded and the notches rather large so as not to interfere with the free movement of the ball and yet prevent it from rotating about a vertical axis. The upper mouth of the "ball" is also rounded and thus avoids danger of damaging the insulation on the electric wires. This ball member is internally threaded to receive the upper threaded end of the part 9 which for convenience may be termed the "plug." The latter screws up comparatively close to the lower end of the ball and has an external diameter greater than the internal diameter of the seat 4 in the canopy. This prevents the ball from becoming entirely unseated and removed. In other words, the plug has a shoulder 10 which, when the parts are assembled, is located a slight distance beneath the lower end of the ball and thus limits the rise of the suspended parts without interfering with the freedom of movement thereof. The plug is hollow and threaded at its lower end to be coupled with the nipple 12. Said nipple is either connected to or forms a part of the stem or down pipe through which the conductors are led to the fixture. If desired, vertical ribs 13 may be formed upon the sides of plug 9 to afford a grip for pipe tongs or other tool employed to screw the parts together.

In practice, the outlet box and the leading in wires (not shown) are installed in the ceiling in the usual manner. As a rule, the canopy, ball and plug constituting the suspension device are shipped assembled. In any event, after the outlet box has been installed, the canopy 1 is fastened to it by screws. The ball and plug then assume a suspended position, as shown in Figs. 1 and 2, after which the nipple or stem is screwed into place. When the fixture has been placed, it will hang vertically regardless of any ordinary tilt in the outlet box and canopy. Furthermore, the fixture is free to swing through a considerable angle. for example, 25 degrees, more or less. Hence if struck by any moving object, as frequently happens in manufacturing and commercial buildings, no damage will be done to the suspension devices, nor will there be any danger of bending the stem of the fixture. At the same time, the ears 6 prevent the fixture from rotating in a horizontal plane and thus twisting the inclosed electric conductors. The swinging of the fixture, even though it should occur very frequently, will have little or no tendency to damage the conductors because of the rounded configuration of the upper end of ball 5 where the conductors pass from the canopy down into the stem.

It will be noted that the number of parts ordinarily required in the old type of fixture is reduced and their configuration both simplified and strengthened. Furthermore, there is a reduction in the amount of labor involved because with this new device all that the installing electrician has to do is to fasten the canopy to the outlet box with ordinary screws and then screw the stem of the fixture either directly into the plug or onto the nipple (which may or may not be furnished with the device, depending upon the preferences of the purchaser). As previously suggested, the shape of the member 1 may be varied and, instead of being conical, it may be rounded or dished or may be considerably flattened without departing from the spirit of the invention.

Having thus described our invention, what we claim as new and desire to secure by Letters Patent, is:

In a suspension device for electric fixtures, a stationary hollow securing member having an opening in its bottom, the wall of which is provided with a longitudinal groove, a supporting member seated in the securing member and movable relatively to the latter in response to swinging tendency of a supported fixture, a fixture coupling secured to the supporting member and having a shoulder for engaging the bottom of the securing member to limit the upward movement of the supporting member, and an ear on the supporting member engaged in said groove to prevent axial rotation thereof, said ear extending downwardly substantially to the shoulder of the coupling to prevent disengagement of the ear from the groove when the supporting member is moved upwardly.

In witness whereof we have hereunto subscribed our names.

HERBERT L. HULL.
THOMAS N. LOFGREN.